(12) United States Patent
Kim et al.

(10) Patent No.: US 12,725,847 B2
(45) Date of Patent: Sep. 1, 2026

(54) IMPURITY CONTROL IN LITHIUM-ION BATTERY RECYCLING

(71) Applicant: Ascend Elements, Inc., Westborough, MA (US)

(72) Inventors: Kee-Chan Kim, Westborough, MA (US); Eric Gratz, Westborough, MA (US)

(73) Assignee: Bluegrass Infrastructure Partners Holdings, LLC, Toronto (CA)

( * ) Notice: Subject to any disclaimer, the term of this patent is extended or adjusted under 35 U.S.C. 154(b) by 561 days.

(21) Appl. No.: 18/237,800

(22) Filed: Aug. 24, 2023

(65) Prior Publication Data

US 2025/0070290 A1 Feb. 27, 2025

(51) Int. Cl.

| | |
|---|---|
| ***H01M 10/54*** | (2006.01) |
| ***C22B 1/02*** | (2006.01) |
| ***C22B 3/00*** | (2006.01) |
| ***C22B 7/00*** | (2006.01) |
| ***C22B 23/00*** | (2006.01) |

(52) U.S. Cl.
CPC ............... *H01M 10/54* (2013.01); *C22B 1/02* (2013.01); *C22B 7/007* (2013.01); *C22B 23/005* (2013.01); *C22B 23/043* (2013.01)

(58) Field of Classification Search
CPC ............................... H01M 10/54; C22B 7/007
See application file for complete search history.

(56) References Cited

U.S. PATENT DOCUMENTS

| | | | |
|---|---|---|---|
| 1,112,799 | A | 10/1914 | Hough |
| 5,200,042 | A | 4/1993 | Houlachi et al. |
| 2023/0198040 | A1 | 6/2023 | Wang et al. |

FOREIGN PATENT DOCUMENTS

| | | | | | |
|---|---|---|---|---|---|
| CN | 115571925 | A | * | 1/2023 | ............. C01G 53/82 |
| CN | 116002646 | A | * | 4/2023 | |
| JP | 2020183559 | A | | 11/2020 | |
| WO | 2022224264 | A1 | | 10/2022 | |
| WO | 2022260596 | A2 | | 12/2022 | |
| WO | 2023039486 | A1 | | 3/2023 | |
| WO | WO-2024034327 | A1 | * | 2/2024 | ............ H01M 10/54 |

OTHER PUBLICATIONS

International Search Report, PCT/US2024/042384, pp. 1-3.

* cited by examiner

*Primary Examiner* — Jonathan G Jelsma
(74) *Attorney, Agent, or Firm* — Armis IP Law, LLC

(57) ABSTRACT

A method of producing a cathode material precursor having low levels of Cu impurities is described. Heat treating a black mass from a recycled lithium-ion battery stream, wherein the black mass comprises copper metal and cathode material comprising nickel, followed by leaching of the heat-treated black mass with an aqueous acid forms an acidic aqueous leach solution comprising nickel metal, cathode metal salts, and copper salts. The copper salts have been found to react with the nickel metal in the aqueous leach solution to form copper metal, which can be readily removed from the acidic aqueous leach solution. Coprecipitation of the cathode metal salts and the nickel salts form nearly Cu-free cathode material precursor.

20 Claims, 2 Drawing Sheets

| Roasted BM Leach | Ni (mg/L) | Mn (mg/L) | Co (mg/L) | Cu (mg/L) |
|---|---|---|---|---|
| First leach | 75,592.29 | 33,523.06 | 36,035.65 | 10.07 |
| Second Leach | 39,428.96 | 4,529.94 | 2,261.19 | 15.58 |
| Filter Cake Wash | 28,643.16 | 1,732.69 | 1,616.40 | 1,153.53 |

Fig. 2A

Metal Leach Results of un-roasted BM

| Un-Roasted BM Leach | Ni (mg/L) | Mn (mg/L) | Co (mg/L) | Cu (mg/L) |
|---|---|---|---|---|
| Leach solution | 55570.50 | 16584.75 | 17435.14 | 3135.49 |

Fig. 2B

Impurity leached into the water solution

| Impurity | Al (mg/L) | Ca (mg/L) | Mg (mg/L) |
|---|---|---|---|
| Cycle 1 | 23.99 | 0.40 | 0.11 |
| Cycle 2 | 25.80 | 0.67 | 0.03 |
| Cycle 3 | 28.63 | 1.18 | 0.03 |
| Cycle 4 | 32.82 | 1.91 | 0.02 |
| Cycle 5 | 35.36 | 2.04 | 0.02 |
| Cycle 6 | 2.70 | 1.21 | 0.00 |
| Cycle 7 | 8.39 | 1.44 | 0.00 |
| Cycle 8 | 4.04 | 1.68 | 0.00 |
| Cycle 9 | 5.79 | 2.03 | 0.00 |
| Cycle 10 | 8.45 | 1.97 | 0.00 |
| Cycle 11 | 34.49 | 2.14 | 0.00 |
| Cycle 12 | 15.69 | 1.93 | 0.00 |
| Cycle 13 | 27.71 | 2.25 | 0.00 |

Fig. 3

IMPURITY CONTROL IN LITHIUM-ION BATTERY RECYCLING

BACKGROUND

Lithium-ion (Li-ion) batteries are a preferred chemistry for secondary (rechargeable) batteries in high discharge applications such as electrical vehicles (EVs) and power tools where electric motors are called upon for rapid acceleration. Li-ion batteries include a charge material, conductive powder and binder applied to or deposited on a current collector, typically a planar sheet of copper or aluminum. The charge material includes anode material, typically graphite or carbon, and cathode material, which includes a predetermined ratio of metals such as lithium, nickel, manganese, cobalt, aluminum, and iron, defining a so-called "battery chemistry" of the Li-ion cells.

Li-ion battery recycling seeks to recover the charge materials from exhausted or spent Li-ion battery cells (cells). Other battery materials, such as lithium and carbon (graphite), may also be recovered. Recycling typically involves physical dismantling, such as grinding or shredding, of old battery packs from a recycling stream, often sourced from end-of-life EVs. The result is a granular black mass including comingled cathode material metals (such as Ni, Mn and Co) and anode materials such as graphite. Other materials, including copper, iron and aluminum, may also be present in residual quantities of impurities resulting from the grinding and shredding of the battery packs. The recycling process includes a leaching of the black mass to recover pure forms of the charge material metals. However, it can be difficult to eliminate all impurities.

SUMMARY

Heat treating a black mass of granular, comingled materials (including cathode materials and anode materials) from a Li-ion battery recycling stream has been found to facilitate removal of impurities such as copper from a subsequent leaching steam by promoting cementation of copper ions removed from the black mass. In the cementation process, copper ions ($Cu^{N+}$) are reduced to copper metal ($Cu^0$), initiated by the downstream separation (leaching) of active metals such as nickel from a heat-treated black mass. Specifically, heat treating of the black mass causes reduction of nickel oxides, which is typically an abundant component in the black mass, to nickel form metal ($Ni^o$). Copper salts, leached from the heat-treated black mass, can then be reduced to copper metal by the presence of the nickel metal, having a higher oxidation potential than Cu in the acidic leach, and can then be subsequently removed. Other impurities, such as calcium and magnesium, can also be extracted. In this way, coprecipitation of the leached active metals such as Ni, Mn and Co results in higher quality charge material for the resulting recycled battery.

Configurations herein are based, in part, on the observation that, in a typical Li-ion battery recycling process, the cathode and anode materials from recycled batteries are shredded and grinded into a comingled granular mixture. Unfortunately, conventional approaches to battery recycling suffer from the shortcoming that copper and aluminum sheets, often employed for electrodes to which the active charge materials are adhered, remain in the mixed granular mass, and other impurities such as copper may result from various connectors and materials from the battery pack. These impurities can be difficult to remove. Accordingly, configurations herein substantially overcome the shortcomings of residual impurities such as copper in the commingled granular mixture by providing removal of copper impurities in the presence of Ni metal formed by heat treatment.

An example configuration employs NMC (Ni, Mn, Co) batteries for recovering valuable materials from a Li-ion battery recycling stream by heat treating a black mass from the recycled battery stream, where the black mass includes at least copper metal and Ni-containing cathode material. An aqueous acid is used for leaching the heat-treated black mass, thereby forming an acidic aqueous leach solution comprising nickel metal and cathode metal salts from the cathode material and copper salts from the copper metal. In this way, the Ni metal produced by the heat-treatment is leached into the acidic aqueous solution, simultaneously reducing the leached Cu ions to Cu metal or suppressing the Cu metal from being leached into the acidic aqueous leach solution. The leach solution can then be used for coprecipitating the cathode metal salts and the nickel salts from the heated acidic aqueous leach solution to form the cathode material precursor for the recycled NMC battery.

BRIEF DESCRIPTION OF THE DRAWINGS

The foregoing and other features will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles of the invention.

FIGS. 2A and 2B show a comparison of impurities that result after heat treating a black mass as described herein compared to no heat treatment; and FIG. 3 shows impurity removal of other metal impurities using the approach of FIG. 1.

DETAILED DESCRIPTION

Figure 1:
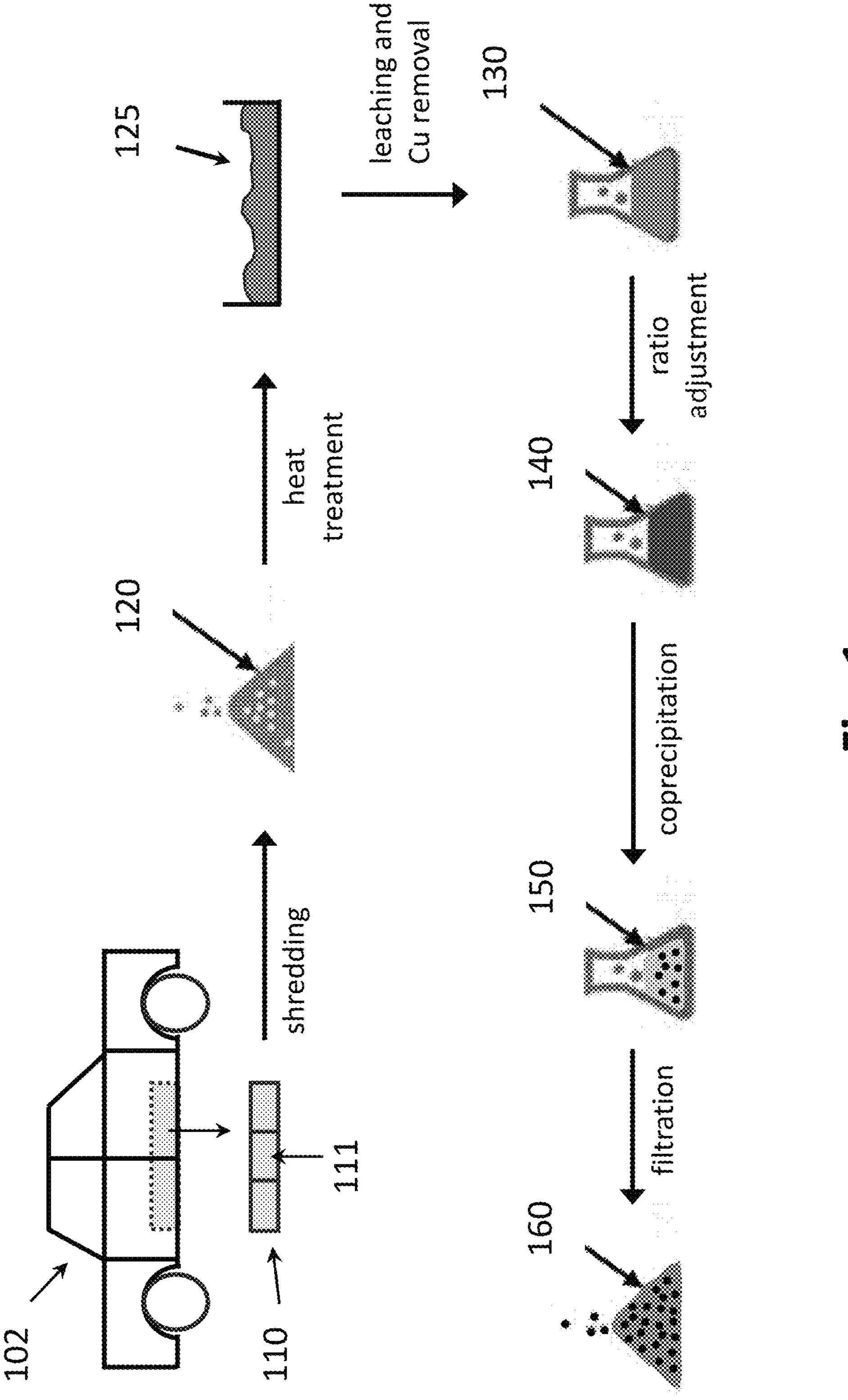
FIG. 1 is a process flow of heat-treating black mass for impurity removal.

Depicted herein is an example method and approach for the heat treatment of black mass to facilitate impurity removal in a battery recycling process. A procedural rendering is depicted, demonstrating the resulting improved purity. A particular focus includes removal of copper due to its reactivity with nickel, which is often readily available in the black mass. However other impurities may also be removed by the approach herein.

Conventional processes separate respective cathode material metals, anode materials, and Li through leaching or dissolving of various components. In the case of cathode materials, a leach solution may be employed to separate Ni, Mn and Co (NMC) from the black mass for use in generating recycled cathode material. Despite the sophistication of the leach process, however, contaminants including copper and iron may still appear in small amounts. It would be beneficial to remove these trace amounts for producing higher purity NMC to result in better performing active cathode materials for the new, recycled battery. The approach herein is employed for self-controlling copper and other impurities in the leaching of cathode active materials from lithium-ion battery black masses by heat treating of the black mass.

Recycling of spent and/or disposed lithium-ion batteries has been mandatory in some countries as an environmental protection measure and for preserving/resourcing of the metals required for lithium-ion batteries, such as Li, Co, Ni and Mn. For recycling batteries on an industrial scale, the lithium-ion batteries should be completely discharged and shredded to obtain the mixed powders of the cathode and anode. However, while grinding and shredding on industrial shredding machines, a portion of the current collectors made of thin aluminum and copper foils are also broken down to small pieces (≤500 μm), and those Cu and Al particles wind up as components of the black mass powder. Removal of these by leaching is difficult. Specifically, copper impurities present in the black mass are also leached, along with the cathode active elements Ni, Mn and Co, resulting in unacceptably high levels of copper impurities in the leach solution. Copper impurity removal has proven to be a challenge in attaining a sufficiently purified metal leach solution to meet specification levels of purity imposed on the resulting synthesized cathode active material precursor (p-CAM).

To solve this problem, in configurations herein, a method of producing a cathode material precursor from a recycled lithium-ion battery stream has been developed that includes heat treating a granularized black mass from the recycled lithium-ion battery stream, wherein the black mass includes copper metal and cathode material comprising nickel. In a typical NMC battery stream, nickel is a significant part or whole of the cathode metals. For example, often Ni is greater than half the total molar ratio of the cathode material—Li $[Ni_aMn_bCo_cO_2]$, wherein 1<a<0.3, 0.4<b<0.0 and 0.4<c<0.0. By heat treating the nickel-containing black mass, as described herein, it is believed that the nickel $(Ni^{+2/+3})$ oxides of the positive active electrode material are reduced to nickel metal $(Ni^0)$.

In more detail, FIG. 1 is a process flow of heat treating a black mass for impurity removal. Referring to FIG. 1, in a Li-ion battery recycling environment, end-of-life, discarded, spent and/or exhausted Li-ion battery packs 110 from electric vehicles 102 create a battery recycling stream. The battery packs 110 include large quantities of raw materials used for battery manufacturing, including charge material metals, lithium, and graphite/carbon. The recycling process flow includes physical dismantling, grinding, and/or shredding of the battery packs 110 and associated individual cells 111 into a comingled granular black mass 120. This black mass includes a somewhat disordered arrangement of the cathode material elements, typically Ni, Mn, Co, and Li, as well as current collector metals of Al and Cu and anode materials of graphite and related forms of carbon.

As shown in FIG. 1, black mass 120 is heat treated, and the resulting heat-treated black mass 125 is subsequently leached with an aqueous acid to form an acidic aqueous leach solution 130, which includes nickel metal and cathode metal salts from the cathode material, and further includes copper salts from dissolution of the copper metal components in the black mass. Any insoluble materials, such as graphitic anode materials, can be removed from the leach solution by filtration or other means, and the resulting precipitate can be further processed and/or purified, if desired.

Heat treatment conditions can vary depending, for example, on the composition of the black mass, which is dependent on the available recycling stream. Typically, the black mass is heat treated at a solids content of from 1 to 50 weight percent and is expected to contain nickel metal from decomposition of the cathode material during the heat treating. Heat treatment preferably occurs at a temperature that is greater than or equal to 500° C., such as between 550° C. and 700° C., including between 575° C. and 650° C., particularly for a black mass comprising 5 wt % or higher Ni. In some configurations, it is preferred that the amount of Ni in the black mass is greater than 50 wt %, such as from 60 wt % to 95 wt %. The heat treatment time can vary depending on the level of impurities in the black mass, with higher levels of Cu typically requiring longer heat treatment times and/or higher temperatures. Generally, heat treatment occurs for a time between 1 minute and 3 hours, such as between 10 minutes and 120 minutes, including 30-60 minutes. Furthermore, it can be beneficial to ensure that the black mass is heat treated in an inert environment, such as a $N_2$ or Ar environment, although a reducing environment (such as $H_2$ or $NH_3$) or a partial oxidizing environment (such as 0.01%-10% $O_2$ balanced with $N_2$, Ar, or $CO_2$) can also be used. For example, a particular configuration provides an oxidizing environment having from 0.05-5% oxygen, preferably 0.1-3.0% oxygen in which controlled amounts of air or oxygen gas are provided from external sources.

Leach solution 130 is formed by leaching of the heat-treated black mass with an aqueous acid, which can include, for example, sulfuric or hydrochloric acid, although any suitable organic or inorganic acid may be used. It is particularly beneficial when the acid is a water-soluble acid and, preferably, having a concentration of at least 25-65 wt %, such as from 35-50 wt %. The liquid to solid (BM) ratio is 0.5-2, and preferably 0.8-1.5. Lower concentrations of acid and higher liquid to solid ratio may not be effectively suppress the Cu impurity dissolution and efficiently convert Cu impurity ions to solid copper species. Hydrogen peroxide or other auxiliary leaching agent may also be included in the aqueous acid. The heat-treated black mass may be leached at a leach temperature of from 20° C. to 100° C. and for a leach time of from 1 to 12 hours, or other suitable temperature or time intervals. A typical leach temperature is from 70° C. to 90° C., avoiding excessive energy consumption associated with higher temperature leaching. The leach temperature is selected such that the copper salts and the nickel metal are reacted in the aqueous leach solution at the leach temperature.

As a result, leach solution 130 includes dissolved nickel metal, cathode metal salts, and copper salts formed from the copper metal. The type and amount of cathode metal salts will depend on the battery chemistry of the batteries used to form the black mass. In one example the cathode metal salts are Ni, Mn and Co salts, such as sulfate salts from sulfuric acid leaching. However other charge material metals and/or leach acid may be used. Furthermore, the leach solution has a molar ratio of cathode metals salts that is based on the constituent composition of the incoming recycling stream. If desired, this molar ratio can be adjusted to yield selected or target ratio-adjusted solution 140, such as by the addition of Ni, Mn and/or Co sulfate salts, either virgin or recycled, or recycled mixed metal salts in a control form As noted above, leach solution 130 is a strongly acidic solution that includes nickel metal, formed from the heat treatment of the black mass, and copper salts. It is believed that, under these conditions, the copper salts and the nickel metal react in the acidic aqueous leach solution to form copper metal and nickel salts. In some configurations, leaching of the heat-treated black mass and reacting of the copper salts and the nickel metal tend to occur simultaneously once combined to form the leach solution. This reaction can be improved or accelerated by heating. Thus, the produced nickel metal $(Ni^0)$ can reduce the leached copper ions $(Cu^{2+})$ to form copper metal $(Cu^0)$ in acidic leach solution 130. This chemical reduction of the $Cu^{2+}$ salt with a metal having higher oxidation potential than Cu, such as Fe and Ni, is sometimes referred to as cementation. As a result of this cementation, solid copper metal is formed and can be removed from the leach solution, such as by filtration, resulting in leach solution 130 that is substantially free of copper.

Cathode active material precursor can then be formed by a coprecipitation reaction in which the pH of aqueous acidic leach solution 130 is adjusted (increased) to form adjusted leach solution 140, thereby causing precipitation of the charge material metals in the targeted ratio resulting from the adjustment. For example, sodium hydroxide or other strong base, along with a chelating agent such as ammonium hydroxide, can be used to cause the charge materials to coprecipitate, forming slurry 150 from which the precipitate is separable by filtration, typically as hydroxides. This granular pCAM (cathode active material precursor) 160, having the desired molar ratio for a target battery chemistry for new, recycled batteries can then be used for forming cathode active material (CAM) by, for example, sintering in a furnace with lithium carbonate or other lithium salts. In an example configuration, cathode active material defined by $LiNi_xMn_yCo_zO_2$ is synthesized by sintering cathode active material precursor, $Ni_xMn_yCo_z(OH)_2$, and z lithium compound such as $Li_2CO_3$, or LiOH. Common chemistries include NMC 111, representing equal molar components of Ni, Mn and Co, NMC 811, NMC 622 and NMC 532, however any suitable molar ratio may be achieved by the ratio adjustment in the leach solution 130 and sintering. The recycled cathode material may then be merged back into the recycling stream as cathode material to form recycled batteries.

Furthermore, as a beneficial improvement, the heat-treated black mass can also be washed with copious amount of water for removal of lithium salts. Specifically, after heat-treatment, the black mass may be washed with relatively large amounts of water to remove soluble impurity metal salts or oxides, such as Mg, Ca and Al salts or oxides, along with soluble lithium compounds converted during the heat treatment. Such water wash may occur in series with the cementation.

In this way, it has been found that heat treating a black mass containing copper metal and cathode materials comprising at least nickel, followed by acid leaching to form an acidic aqueous leach solution, results in the formation of cathode material precursor (pCAM) as well as cathode material (CAM) having very low $Cu^{2+}$ ion impurity levels. The acidic aqueous leach solution is expected to contain less than 100 ppm copper salts after the cementation effect, preferably less than 30 ppm Cu. The disclosed approach provides a viable and beneficial solution to avoid the impurity problems in the metal leached solution, for not only Cu but also other impurities such as Ca and Mg.

A particular example shows copper impurity reduction/suppression by leaching a heat-treated and water washed black mass. Specifically, FIGS. 2A and 2B show impurity levels resulting from leaching of a heat-treated black mass as defined herein compared to those resulting from leaching of a non-heat-treated black mass. Referring to FIGS. 1 and 2A-2B, a black mass from a recycled battery stream was heat-treated at 650° C. for 1 hour under <3% $O_2$ conditions, balanced with nitrogen, and then water washed at room temperature for 30 minutes at room temperature with copious amount of deionized water to remove lithium carbonate along with additional water-soluble impurities. The resulting lithium carbonate-removed black mass was then dried in an oven at 150° C. overnight. The dried delithiated black mass (200 gr) was then mixed with 96 mL of deionized water followed by 76 mL of 93 wt % $H_2SO_4$ added dropwise with ample agitation. In addition, 53 mL of 35 wt % $H_2O_2$ was also added dropwise to the reaction solution, and the resulting mixture was continuously stirred for 4 hours at 80° C.-90° C. The resulting acidic aqueous leach solution was then filtered without ratio adjustment to form a filter cake and a first leach solution, which was analyzed for content by ICP-OES (Inductively Coupled Plasma-Optical Emission Spectroscopy). The filter cake was leached again with 72 mL of deionized water, 32 mL of 93 wt % $H_2SO_4$ and 6 mL of 35 wt % $H_2O_2$ under the same leach conditions to form a second leach solution. Finally, after filtration of the second leach solution, the filter cake was washed with 880 mL of hot DI water.

As seen in FIG. 2A, Cu impurity is very low in both the first and the second leach solutions. This indicates that, as a result of heat treatment, Cu impurities are converted to insoluble copper (copper metal), which remain with the black mass and are not leached into the acidic aqueous leach solution. However, Cu impurities are noticeably high in the final wash solution because the remaining acids in the solid filter cake convert a portion of the copper metal to soluble copper sulfate in the cake, based on Ni metal which was consumed completely in the leaching, which can then be extracted out during the water washing.

For comparison, one step leaching of the black mass without heat treatment was conducted by combining 100 g of black mass, 144 mL of DI $H_2O$, 56 mL of 93 wt % $H_2SO_4$ and 40 mL of 35 wt % $H_2O_2$ under the same reaction condition as above. ICP-OES results of the acidic aqueous leach solution are shown in FIG. 2B. As can be seen, the Cu impurity level is very high in the leach solution, indicating that most of the undesired Cu from the non-heat-treated black mass dissolved into the acidic aqueous leach solution, along with the desired Ni, Mn, and Co.

Another example shows how water-soluble impurities, such as Al and Ca, are also removed after water washing of a heat-treated black mass, particularly after lithium carbonate recovery. Referring to FIGS. 1 and 3, 100 g of black mass was heat treated at 650° C. for 1 hour under <3% $O_2$ balanced with $N_2$. The resulting heat-treated black mass was added to 3 L of deionized water at room temperature, and the mixture was stirred for 30 minutes at room temperature. As can be seen by the results of the 13 replicates of FIG. 3, substantial quantities of at least Al and Ca (2-11%) were also removed from the heat-treated black mass.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method of producing a cathode material precursor from a recycled lithium-ion battery stream, comprising:

heat treating a black mass from the recycled lithium-ion battery stream, the black mass comprising copper metal and cathode material comprising nickel;

leaching the heat-treated black mass with an aqueous acid to form an acidic aqueous leach solution comprising nickel metal and cathode metal salts from the cathode material and copper salts from the copper metal;

reacting the copper salts and the nickel metal in the aqueous leach solution to form copper metal and nickel salts;

removing the copper metal from the acidic aqueous leach solution, and co-precipitating the cathode metal salts and the nickel salts from the acidic aqueous leach solution to form the cathode material precursor.

2. The method of claim 1, wherein the black mass comprises at least 5 weight percent nickel.

3. The method of claim 1, wherein the cathode material comprises 50 mole % nickel.

4. The method of claim 1, wherein the cathode material further comprises cobalt and manganese.

5. The method of claim 1, where the black mass is heat treated at a temperature greater than or equal to 500° C. and for a time between 1 minute and 2 hours.

6. The method of claim 5, wherein the temperature is from 550° C. to 700° C.

7. The method of claim 1, wherein the black mass is heat treated in an environment selected from an inert environment, a reducing environment, or a partial oxidizing environment.

8. The method of claim 7, wherein the black mass is heat treated in a partial oxidizing environment comprising from 0.01% to 5% oxygen.

9. The method of claim 1, wherein the black mass is heat treated at a solids content of from 1 to 80 volume percent to the inner chamber volume of the furnace.

10. The method of claim 1, wherein the heat-treated black mass comprises nickel metal from decomposition of the cathode material during heat treating.

11. The method of claim 1, wherein the heat-treated black mass is leached at a leach temperature of from 20° C. to 100° C. and for a leach time of from 1 to 12 hours.

12. The method of claim 11, wherein the leach temperature is from 70° C. to 90° C.

13. The method of claim 11, wherein the copper salts and the nickel metal are reacted in the aqueous leach solution at the leach temperature.

14. The method of claim 1, wherein the aqueous acid comprises a water-soluble acid at a concentration of 25-65 wt %.

15. The method of claim 1, wherein the aqueous acid is sulfuric acid or a combination of sulfuric acid and hydrogen peroxide and a liquid (v) to solid (wt) ratio is 0.5-2 v/w %.

16. The method of claim 1, wherein leaching the heat-treated black mass and reacting the copper salts and the nickel metal occur simultaneously.

17. The method of claim 1, wherein the acidic aqueous leach solution comprises less than 100 ppm copper salts.

18. The method of claim 1, further comprising water washing the heat-treated black mass to extract lithium prior to leaching.

19. The method of claim 1, further comprising adjusting a ratio of the cathode metal salts to a selected ratio with additional metal salts.

20. A method of producing a cathode material precursor from a recycled lithium-ion battery stream, comprising:

heat treating a black mass from the recycled lithium-ion battery stream at a temperature greater than or equal to 500° C., the black mass comprising copper metal and cathode material comprising nickel, leaching the heat-treated black mass with an aqueous acid having a concentration of a water-soluble acid of from 25-65 wt % at a leaching temperature of from 20° C. to 100° C. to form an acidic aqueous leach solution;

removing copper metal from the acidic aqueous leach solution, and co-precipitating cathode metal salts and nickel salts from the acidic aqueous leach solution to form the cathode material precursor.

* * * * *